Feb. 5, 1974  M. J. FULWYLER  3,790,492
METHOD FOR PRODUCTION OF UNIFORM MICROSPHERES
Filed March 11, 1971
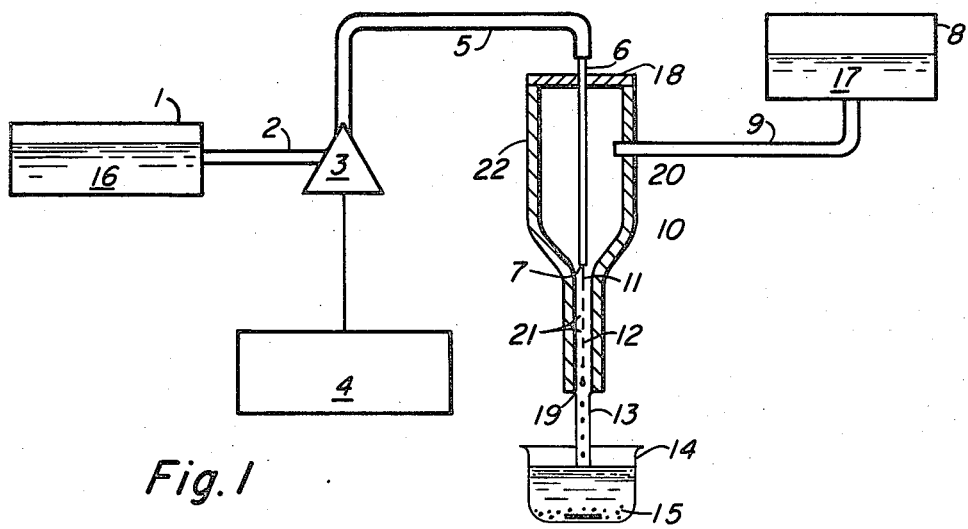
Fig. 1
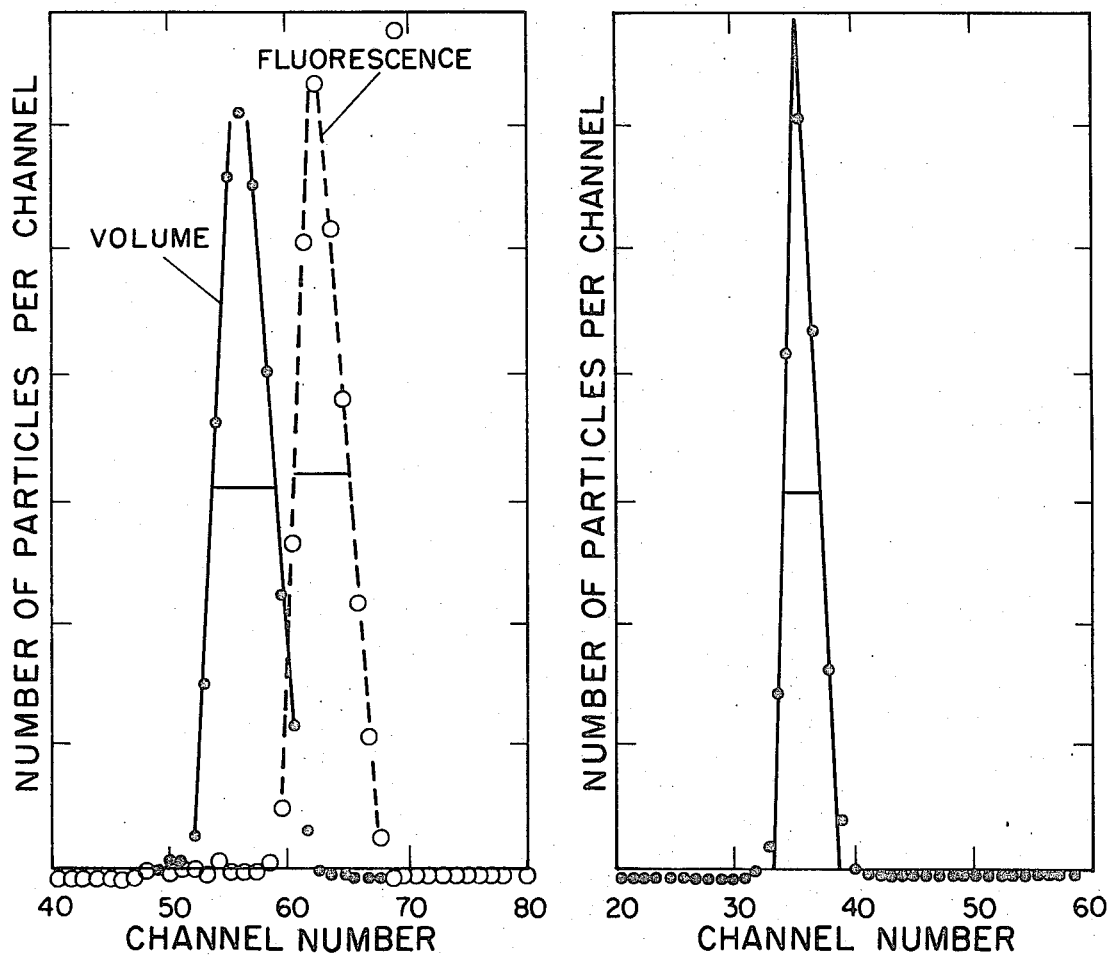
Fig. 2
Fig. 3
INVENTOR.
Mack J. Fulwyler
BY

United States Patent Office

3,790,492
Patented Feb. 5, 1974

3,790,492
METHOD FOR PRODUCTION OF UNIFORM
MICROSPHERES
Mack J. Fulwyler, Los Alamos, N. Mex., assignor to the United States of America as represented by the United States Atomic Energy Commission
Filed Mar. 11, 1971, Ser. No. 123,362
Int. Cl. C09k 3/00
U.S. Cl. 252—301.1 R    1 Claim

ABSTRACT OF THE DISCLOSURE

Uniform microspheres having any desired diameter within the range of about 2 to 40 microns are readily produced by introducing a laminar jet of a core liquid carrying material in solution or suspension within a laminar flowing sheath liquid, said core liquid jet being periodically disturbed, allowing the droplets of core liquid thus produced to remain suspended within the sheath liquid for a time sufficient for the material suspended or dissolved in said droplets to form condensed microspheres, and removing said microspheres from the sheath liquid. The variation in diameter of the microspheres is about 2%, which is near the accuracy limitation of the measuring instrumentation.

BACKGROUND OF THE INVENTION

The invention described herein was made in the course of, or under, a contract with the U.S. Atomic Energy Commission. It relates to a method and apparatus for preparing uniform microspheres of various materials through dispersal of uniform droplets of a first (core) liquid containing an appropriate material in solution or suspension in a second (sheath) liquid immiscible with the core liquid and condensation of the material suspended or dissolved in the core liquid droplets.

Small microspheres of very uniform volume have utility in a number of fields. For example, uniform plastic microspheres having known and controllable physical and optical properties are of great aid in developing instruments for biological cell analysis. They are also highly useful in the calibration of such instruments. Uniform volume microspheres of uranium oxide and plutonium oxide provide useful reactor fuel materials. Microspheres of radioactive materials that are uniform in size and volume are highly desirable for use in many biological studies, including those concerning deposition of various sizes of blood-borne particles in the lungs, distribution of fetal blood flow, and distribution of cardiac output. An example of work of this type is reported in "Preparation of Metabolizable Radioactive Human Serum Albumin Microspheres for Studies of the Circulation," I. Zolle, B. A. Rhodes, and H. N. Wagner, Jr., Internat. J. Appl. Isotopes 21, 155–167 (1970).

A well-known technique for forming microspheres involves the use of two liquids which coexist as distinct phases with a boundary surface and therefore have surface tension between them. For such a surface tension to exist, however, it is essential that the two liquids be immiscible. Droplets of a first liquid, henceforth called the core liquid, in which a material is dissolved or suspended, are formed in a moving stream of the second liquid, henceforth called the sheath liquid. The liquid of the droplets is slightly soluble in the sheath liquid and consequently diffuses out, leaving a spherical particle. Microspheres can be produced by this technique over a wide range of diameters from a few microns to many hundreds of microns. The size of the microspheres depends on the size of the droplets formed and on the amount of material dissolved or suspended in the droplets.

Clinton et al. in U.S. Pat. 3,290,122, issued Dec. 6, 1966, disclose the application of this technique to the preparation of oxide gel microspheres from sols. They use a two-fluid nozzle in which droplets of the core liquid are produced by concurrently introducing a fine stream of the core liquid and a surrounding stream of the sheath liquid into a droplet forming zone through a central aperture and a concentric annular aperture, with the flow rate of the sheath liquid being substantially greater than that of the core liquid. The literature indicates that to produce uniformly sized droplets with a two-fluid nozzle, the sheath liquid flow must be laminar, and the core liquid should be injected in such a manner as to minimize turbulence.

Haas et al. in U.S. Pat. 3,331,898, issued July 18, 1967, disclose a method of preparing gel microsphere wherein the core liquid is formed into droplets by passing the core liquid stream through small orifices into the sheath liquid stream at an angle to the direction of flow of the sheath liquid. Droplets of core liquid are produced by the high shearing force that results.

A significant problem with gel microspheres produced by the methods disclosed in U.S. Pats. 3,290,122 and 3,331,898 is that they are not uniform in size. The examples disclosed within these two patents show a wide spread in diameters of the microspheres formed. For many applications, such variation in size cannot be tolerated. Wymer, "Laboratory and Engineering Studies of Sol-Gel Processes at Oak Ridge National Laboratory," ORNL-TM–2205, pp. 33–39 (1968), discloses that droplets formed from capillaries vibrated transversely by an electrodynamic device are more uniformly sized than those from a two-fluid nozzle or a shear disperser. However, even these droplets produce microspheres having an undesirably wide range of sizes.

In addition, the disclosure of Wymer is limited to the production of microspheres having an average diameter in excess of 250 microns. He does not disclose the production of very small microspheres, i.e., those having diameters less than 50 microns. It is well known in the art that techniques useful for the production of fairly large microspheres, that is, those having diameters in excess of several hundred microns are not generally applicable to the production of very small microspheres.

SUMMARY OF THE INVENTION

I have now found that by using a two-fluid nozzle in which a laminar jet of a core liquid carrying material in solution or suspension is introduced within a laminar flowing sheath liquid and periodically disturbed, very uniformly sized droplets and hence very uniformly sized gel microspheres can be readily produced. The laminar sheath flow maintains a uniform separation of the droplets, thus preventing droplet coalescence to give larger droplets and therefore larger microspheres. The periodic disturbance may be introduced into the core liquid jet either axially or transversely; however, it is essential that it have a uniform frequency. The optimum frequency is determined by the diameter and velocity of the jet. Because of the resonant nature of the system, under a given set of conditions several suitable frequencies are usually available.

Moreover, the method and apparatus that I have developed are not limited to the production of gel microspheres but are useful in the production of a wide variety of very small uniformly sized microspheres, i.e., those having diameters ranging from several microns to about 40 microns. For example, my invention is easily directed toward the production of plastic microspheres useful in the calibration of instrumentation such as Coulter cell counters. To my knowledge, there is no other process that can readily produce uniformly sized plastic microspheres in the 4 to 30 microns range. I have found that the variation in diameter of the microspheres produced by the method and apparatus of my invention is about 2%, which is near the accuracy limitation of the measuring instrumentation.

BRIEF DESCRIPTION OF THE DRAWINGS

FIG. 1 is a schematic illustrating an apparatus useful in the practice of the invention.

FIG. 2 illustrates the degree of uniformity of volume and of fluorescence of representative plastic microspheres produced according to the process of this invention.

FIG. 3 illustrates the degree of uniformity of volume of representative zirconia microspheres produced according to the process of this invention.

As shown in FIG. 1, core liquid 16 stored in reservoir 1 at a desired pressure flows through a suitable line 2 to vibration chamber 3 where vibrational energy is introduced at a desired frequency by means of an oscillator 4. The core liquid then flows through line 5 into injection tube 6 and emerges from nozzle 7 as a jet 11. Injection tube 6, which is centered coaxially in flow chamber 10, extends vertically from flow chamber 10 through end closure 18 and only partially through the length of flow chamber 10. Sheath liquid 17 stored at a desired pressure in reservoir 8 flows through line 9 to flow chamber 10, around injection tube 6 and core liquid jet 11 and emerges from nozzle 19 to be collected in a stirred beaker 14. Neither the location of sheath liquid inlet 20 nor the shape of flow chamber 10 are critical except as they may cause the flow of sheath liquid through region 21 to be nonlaminar. It is essential that sheath liquid flow in region 21 where the sheath liquid surrounds core liquid jet 11 and newly formed core liquid droplets 12 be laminar.

Because of the vibrational energy imparted to the core liquid flow at vibration chamber 3, the pressure at nozzle 7 varies periodically around the pressure maintained in core liquid reservoir 1. As a consequence, the velocity of core liquid jet 11 varies periodically, producing minute disturbances or bunching on jet 11. By producing these ditsurbances at a proper frequency, determined by the jet diameter and velocity, they are made to grow in amplitude by surface tension until jet 11 is broken into evenly spaced, uniformly sized droplets 12. Because both the sheath liquid flow and core liquid flow are laminar, droplets 12 once produced maintain substantially constant spacing as they emerge from nozzle 19 and flow 13 to beaker 14 where they are dispersed. Maintenance of such uniform spacing between droplets is essential if collisions between droplets and hence coalescence to give droplets with volumes 2, 3, or 4 times that of single droplets is to be minimized before the droplets are dispersed in beaker 14. Collision and coalescence of droplets is a major reason for the formation of nonuniform microspheres.

It is therefore critical to this invention that a laminar core liquid jet 11 be periodically disturbed when it enters into a laminar flow of sheath liquid as in region 21 of flow chamber 10. The periodic disturbance may take the form of axial velocity modulation of the core liquid. One manner in which such axial velocity modulation can be readily achieved is shown by vibration chamber 3 and oscillator 4 of FIG. 1. However, the vibrational energy can be introduced in a manner other than that shown in FIG. 1. Alternatively, the entire injection tube 6 can be vibrated along its long axis, or vibrational energy can be introduced into the sheath liquid flow, causing the pressure difference across nozzle 7 to vary periodically. Although FIG. 1 shows the periodic disturbance applied axially to the core liquid jet, there is no requirement that the disturbance be introduced axially. A transverse periodic disturbance will produce essentially the same results.

The size of the droplets 12 formed is dependent on the size of nozzle 7 and on the rate of flow through nozzle 7. Th size of the microspheres that are produced from the droplets in turn depends on the droplet size and the amount of material held in solution or suspension within the droplets. The volume and thereby the diameter of a microsphere produced from a droplet of a known size is easily controlled by varying the concentration of solute or suspended material in the droplets. For example, to double the diameter of the microspheres produced from droplets of a known size, it is necessary to increase the concentration of solute or suspended material within the droplets by a factor of $2^3$ or 8.

The rate of droplet formation and hence of microspheres formation is dependent on the frequency of disturbance of the core liquid, as for example, by means of oscillator 4, and upon the flow rates of the core liquid and the sheath liquid in region 21 of FIG. 1.

On FIGS. 2 and 3 the horizontal axis represents particle volume on a linear scale and the vertical axis represents the number of particles per volume increment. On FIG. 2 th horizontal axis also represents particle fluorescence on a linear scale. The curves of FIGS. 2 and 3 were obtained with a modified Coulter counter used as the measuring device. Modal value of these volume distributions is determined by an optical measurement of microsphere diameter. It will be apparent that a measurement of the volume of these microspheres gives a sensitive indication of the diameter of the microspheres.

The coefficient of variation for the volume distribution is determined according to the following equation.

$$\frac{\text{Full width at half maximum}}{\text{Modal value}} \times 100 \times \frac{1}{2.35} = \text{C.V.}$$

The last factor in the equation represents approximately the relationship between resolution and coefficient of variation for Gausian distribution.

DESCRIPTION OF THE PREFERRED EMBODIMENTS

The apparatus of FIG. 1 can be used to produce uniform microspheres having any desired diameter within the range of about 2 to 40 microns although these limits have been challenged. The inside diameter of nozzle 7 is 50 microns while that of nozzle 19 is 1 mm. The I.D. of flow chamber 22 is 3 mm. Typically, the core liquid is held in reservoir 1 at a pressure of about 50 p.s.i., while the sheath liquid is held in reservoir 8 at a pressure of about 30 p.s.i. Under these conditions the flow rates of core and sheath liquid through region 21 are about 0.9 cc./min. and about 110 cc./min., respectively. Note that the flow rate through an orifice of given size under a set pressure difference is dependent on the viscosity of the liquid. The oscillator 4 normally operates at a frequency of about 20 kHz. This results in droplets and therefore microspheres being formed at a rate of about 20,000 per second.

EXAMPLE I

The apparatus of FIG. 1 was used to produce uniform thoria microspheres in the following manner. A core liquid consisting of an aqueous solution containing 4.15 mg./cc. of thoria sol was placed in reservoir 1 at a pressure of 50 p.s.i. A sheath liquid consisting of 2-ethyl-1-hexanol containing 0.2% by volume of ammonium hydroxide, 0.005% by volume of Ethomeen S/15, and 0.05% by volume of Triton X-100 was placed in reservoir 8 at a pressure of 30 p.s.i. Ethomeen S/15 is a surfactant which consists of an ethylene oxide condensation product of the primary fatty tertiary aminess. Triton X-100 is a surfactant product of Rohm & Haas Company which consists of alkylphenoxy polyethoxy ethanol with 9 or 10 oxyethylene groups. At these respective pressures, the flow rate of the core liquid was approximately 0.9 cc./min. while that of the sheath liquid was approximately 110 cc./min. Once flow of core liquid and sheath liquid had commenced through injection tube 6 and flow chamber 22, respectively, oscillator 4 was operated at a frequency of about 19.2 kHz. This imparted a periodic disturbance to the core liquid and produced 19,200 droplets per second from the core liquid jet emerging from nozzle 7. Nozzle 7 had an I.D. of 50 microns. These droplets were held in a spaced relationship to each other by the laminar flow of sheath liquid through region 21 of the apparatus of FIG. 1. The droplets and their surrounding sheath liquid were allowed to flow into a beaker which was magnetically stirred. The water in the droplets is slightly soluble in the 2-ethylhexanol so that it diffuses out, leaving gelled microspheres. The droplets are left in the sheath liquid for a time sufficient for the microspheres to gel. In this particular example, the droplets were left in the 2-ethylhexanol for approximately 20 minutes. The gelled microspheres thus produced had diameters of 14 microns. They were then dried at 180° C. and calcined at 950° C. The thoria microspheres produced on calcining had diameters of 8.3 microns. The volume distribution of these microspheres was similar to that shown in FIG. 3 for zirconia microspheres produced in a similar manner.

EXAMPLE II

The apparatus of FIG. 1 was used to produce uniform zirconia microspheres in the following manner. A core liquid consisting of an aqueous solution containing 5.3 mg./cc. of zirconia sol was placed in reservoir 1 at a pressure of 49 p.s.i. A sheath liquid consisting of 2-ethyl-1-hexanol containing 0.1% by volume of ammonium hydroxide and 0.05% by volume of Triton X-100 was placed in reservoir 8 at a pressure of 34 p.s.i. Triton X-100 is a surfactant which consists of alkylphenoxy polyethoxy ethanol with 9 or 10 oxyethylene groups. At these respective pressures, the flow rate of the core liquid was approximately 0.6 cc./min. while that of the sheath liquid was approximately 100 cc./min. Once flow of core liquid and sheath liquid had commenced through injection tube 6 and flow chamber 22, respectively, oscillator 4 was operated at a frequency of about 20.6 kHz. This imparted a periodic disturbance to the core liquid and produced 20,600 droplets per second from the core liquid jet emerging from nozzle 7. Nozzle 7 had an I.D. of 50 microns. These droplets were held in spaced relationship to each other by the laminar flow of sheath liquid through region 21 of the apparatus of FIG. 1. The droplets and their surrounding sheath liquid were allowed to flow into a beaker which was magnetically stirred. The water in the droplets diffused into the 2-ethylhexanol in the manner described in Example I. The droplets were left in the 2-ethylhexanol for approximately 20 minutes. The gelled microspheres thus produced had diameters of 18 microns. They were then removed, dried, and calcined at 950° C. The zirconia microspheres produced on calcining had diameters of 10 microns. The coefficient of variation in volume of the microspheres, as calculated from the curve shown in FIG. 3, was 3.7%.

EXAMPLE III

The apparatus of FIG. 1 was used to produce uniform polystyrene microspheres containing a fluoroescent dye in the following manner. A core liquid consisting of a 25% dichloroethane-75% dichloromethane solution containing 0.0533% by wt./vol. of polystyrene and $1.5 \times 10^{-5}$ g./l. of solvent of a fluorescent dye was placed in reservoir 1 at a pressure of 6 p.s.i. The dye was Maxilon Brilliant Flavine 10GFF (63040) manufactured by Geigy Company. A sheath liquid consisting of water containing 0.15% by volume of Liquinox was placed in reservoir 8 at a pressure of 4.2 p.s.i. Liquinox is a surfactant produced by Alconox, Inc. At these respective pressures, the flow rate of the core liquid was approximately 0.17 cc./min. while that of the sheath liquid was approximately 60 cc./min. Once flow of core liquid and sheath liquid had commenced through injection tube 6 and flow chamber 22, respectively, oscillator 4 was operated at a frequency of about 6,300 cycles/second. This imparted a periodic disturbance to the core liquid and produced 6,300 droplets per second from the core liquid jet emerging from nozzle 7. Nozzle 7 had an I.D. of 31 microns. These droplets were held in a spaced relationship to each other by the laminar flow of sheath liquid through region 21 of the apparatus of FIG. 1. The droplets and their surrounding sheath liquid were allowed to flow into a beaker which was magnetically stirred. The solvent in the droplets is slightly soluble in the water of the sheath liquid so that it diffuses out, leaving solid microspheres of polystyrene. The droplets were left in the water for approximately 20 minutes. The polystyrene microspheres produced had diameters of 10 microns. The coefficient of variation in volume of the microspheres, as calculated from the volume curve of FIG. 2, was 2.9%. The coefficient of variation in fluorescence, as calculated from the fluorescence curve of FIG. 2, was 4%.

Examples I and II disclose the formation of small very uniform microspheres of thoria and zirconia from a starting material comprising an aqueous sol of the oxide. It is well known in the art that numerous metal oxides form such sols and can be reduced to gels by appropriate dehydration techniques. In particular, Clinton et al. in U.S. Pat. 3,290,122 disclose the formation of microspheres by the "sol-gel" process from actinide metal oxides. On the basis of that patent and various other disclosures in the literature, one of reasonable skill in the art will realize that my method of forming small uniform microspheres is not limited to formation of thoria and zirconia microspheres but is applicable to the production of a wide variety of metal oxide and mixed metal oxide gel microspheres in accordance with sol-gel techniques. For example, such techniques are described in some detail in the International Atomic Energy Agency document "Sol-Gel Processes for Ceramic Nuclear Fuels" (Vienna, 1968). U.S. Pat. 3,290,122 is hereby incorporated into and made a part of this application by reference.

In U.S. Pat. 3,422,167, issued Jan. 14, 1969, Bowman et al. disclose metal oxide gel microspheres of alumina, zirconia, hafnia, europia, thoria, urania, plutonia, and mixtures thereof formed by jetting a corresponding metal oxide sol into a freezing medium, freezing, subsequently dehydrating by vacuum distillation after removal of the freezing medium, and calcining into fired product. U.S. Pat. 3,422,167 is hereby incorporated into and made a part of this application by reference. In U.S. Pat. 3,551,533, issued Dec. 29, 1970, Monforte et al. disclose the formation of uniform spheres of a wide variety of materials by freeze-drying an atomized solution. Again, it will be readily understood that my method of forming small uniform microspheres is easily adapted to such freeze-dry techniques by using a sheath liquid that will serve as an appropriate freezing medium.

What is claimed is:

1. A method for producing uniformly sized particles which comprises introducing through a two-fluid nozzle a laminar jet of a stable hydrous oxide sol core liquid into a laminar flow sheath liquid consisting of an organic liquid having a water solubility of 0.3 to 10 volume percent and a solubility in water of less than one volume percent and containing a surfactant, said core liquid jet being periodically disturbed prior to its introduction into the laminar flow sheath liquid, to form uniformly sized droplets of core liquid in uniform space relation within said laminar flow sheath liquid, allowing the droplets of core liquid thus produced to remain within the sheath liquid for a time sufficient for the material to form condensed spheres between 2 and 40 microns in diameter and then removing said spheres from the sheath liquid.

References Cited

UNITED STATES PATENTS

| | | | |
|---|---|---|---|
| 3,331,898 | 7/1967 | Haas et al. | 264—.5 |
| 3,340,567 | 9/1967 | Flack et al. | 264—.5 X |
| 3,352,950 | 11/1967 | Helton et al. | 264—.5 |
| 3,463,842 | 8/1969 | Flack et al. | 252—301.1 S |
| 3,617,584 | 11/1971 | Flack et al. | 252—301.1 S |

STEPHEN J. LECHERT, JR., Primary Examiner

U.S. Cl. X.R.

264—.5